United States Patent [19]

Ohnaka

[11] 4,065,001
[45] Dec. 27, 1977

[54] MANIPULATOR

[75] Inventor: Makoto Ohnaka, Yokohama, Japan

[73] Assignee: Shiroyama Kogyo Co., Ltd., Japan

[21] Appl. No.: 696,250

[22] Filed: June 15, 1976

[51] Int. Cl.[2] .............................................. B65G 47/91
[52] U.S. Cl. ......................... 214/1 BV; 214/DIG. 10;
214/147 T; 214/763
[58] Field of Search ................. 214/1 B, 1 BS, 1 BC,
214/1 BH, 1 BD, 1 BV, 147 G, 147 T, DIG. 10,
1 CM, 146.5, 148, 763

[56] References Cited

U.S. PATENT DOCUMENTS

| 2,697,529 | 12/1954 | Hubbell et al. | 214/147 T |
| 2,861,699 | 11/1958 | Youmans | 214/1 BD X |
| 3,703,968 | 11/1972 | Uhrich et al. | 214/1 CM X |
| 3,952,890 | 4/1976 | Armstrong | 214/DIG. 10 X |

Primary Examiner—Frank E. Werner
Attorney, Agent, or Firm—Frank J. Jordan

[57] ABSTRACT

A manipulator includes a first arm assembly having a base end portion and a free end portion and attaching means on which the base end portion is pivotally mounted by first pivotal means for pivotal movement about a first pivotal axis. First power means are operatively connected to the first arm assembly to effect rotation of the latter about the first pivotal axis. The manipulator also includes a second arm assembly having a base end portion and a free end portion and second pivotal means pivotally mounting the base end portion of the second arm assembly to the free end portion of the first arm assembly for pivotal movement about a second pivotal axis. Second power means are provided and coupling means couple the second power means to the second arm assembly to effect rotation of the latter about the second pivotal axis. Holding means on the free end portion of the second arm assembly are provided for holding an article which is to be moved by the manipulator.

8 Claims, 4 Drawing Figures

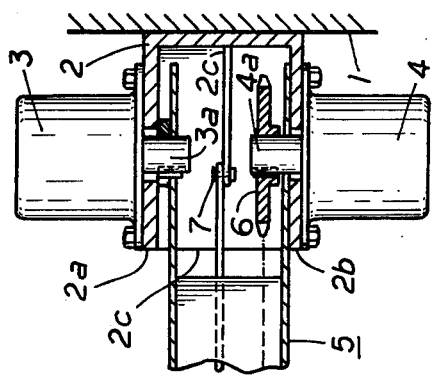
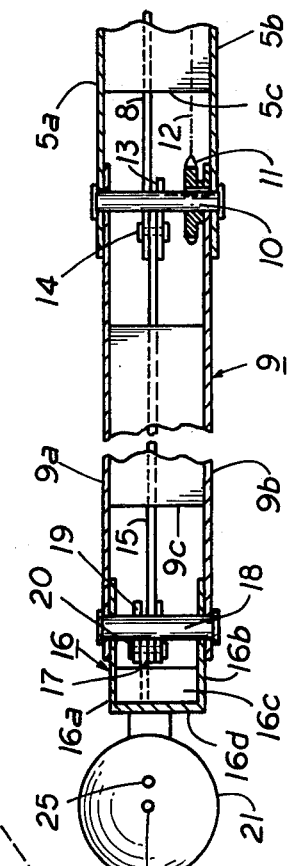
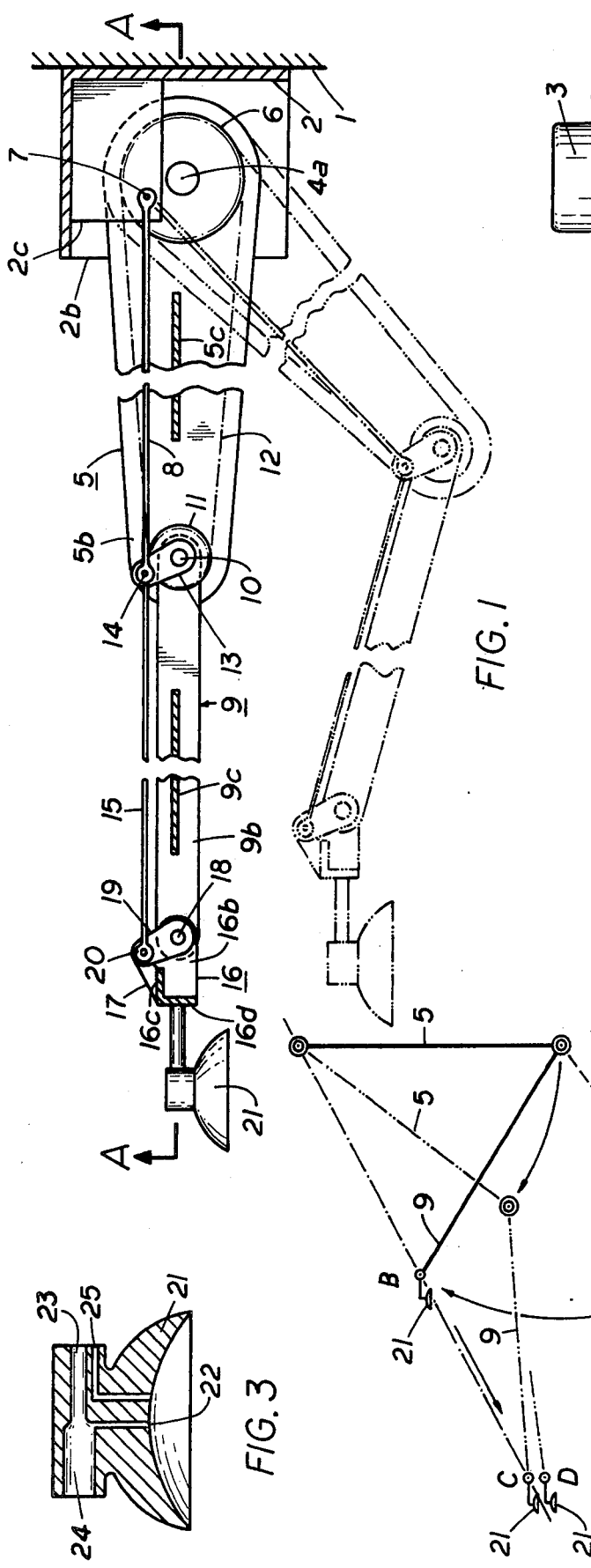

MANIPULATOR

BACKGROUND OF THE INVENTION

This invention relates to a manipulator and more particularly to a manipulator in which the driving or power means are mounted on an attaching portion of the manipulator, thereby making the handling easier and providing for effective load distribution.

Accordingly, an object of the present invention is to provide an efficient manipulator which is operable to pick up and move articles to different places or positions as may be desired, for example in handling articles which are subjected to a pressing or stamping operation or the like in a pressing or stamping machine or press.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A manipulator comprises a first arm assembly having a base end portion and a free end portion, attaching means on which the base end portion is pivotally mounted by first pivotal means for pivotal movement about a first pivoted axis, first power means operatively connected to the first arm assembly to effect rotation of the latter about the first pivotal axis, a second arm assembly having a base end portion and a free end portion, second pivotal means pivotally mounting the base end portion of the second arm assembly to the free end portion of the first arm assembly for pivotal movement about a second pivotal axis, second power means, coupling means coupling the second power means to the second arm assembly to effect rotation of the latter about the second pivotal axis, and holding means on the free end portion of the second arm assembly for holding an article which is to be moved by the manipulator.

BRIEF DESCRIPTION OF THE DRAWINGS

FIG. 1 is an elevational view of a manipulator according to one embodiment of the present invention, with one of the side plates removed.

FIG. 2 is a cross sections view taken along the line A—A in FIG. 1. FIG. 3 is a vertical sectional view of the suction cup.

FIG. 4 is a schematic drawing showing operational positions of the manipulator.

DESCRIPTION OF THE PREFERRED EMBODIMENTS

Referring to the drawings FIG. 1 and FIG. 2 show supporting elements 2a, 2b and 2c joined to an attaching element 2 fastened to a wall 1 in such a manner that such supporting elements 2a, 2b and 2c are parallel to each other and perpendicular to the attaching element 2.

A first rotary cylinder motor means 3 and a second rotary cylinder motor means 4 are installed at the outer sides of the support elements 2a and 2b respectively so that they are disposed in the coaxial relation opposed to each other.

A first arm assembly 5 comprises of a pair of side plates 5a and 5b which are disposed vertically, and a connecting plate 5c which is slightly shorter than the side plates 5a, 5b and which is placed at the center of the side plates so as to have an H-shaped configuration. A driving axle 3a of the first rotary cylinder motor means 3 passes through the support element 2a and is fixed to the right side of the side plate 5a. A driving axle 4a of the second rotary cylinder motor means 4 passes through the support element 2b and the right side of the side plate 5b, and a first sprocket 6 is fastened to the end portion of the axle 4a.

A pin 7 is fastened to the left edge of the central support element 2c, and this pin 7 is attached to the right end of a first coupling lever 8. Similarly to the first arm assembly, a second arm assembly 9 comprises side plates 9a and 9b and a connecting plate 9c. To both ends of a rotary axle 10 which passes through the side plates 9a and 9b at the right side, are attached the left end portions of side plates 5a and 5b of the first arm assembly 5 respectively in such a manner that the side plates 5a and 5b come into contact with the outer faces of the side plates 9a and 9b respectively.

A second sprocket 11 is fixed to the rotary axle 10 at the inner side of the side plate 9b. A chain 12 is disposed between the second sprocket 11 and the first sprocket 6. The lower edges of a pair of link plates 13,13 which are parallel to each other with a slight space therebetween are fixed to the rotary axle 10, and a pin 14 is fixed to their upper ends. The left end of the first coupling lever 8 and the right end of a second coupling lever 15 are pivotally attached to the pin 14 between the link plates 13,13. The distance between the pin 7 and the pin 14 of the first coupling lever 8 is equal to that between the rotary axle 10 and the driving axle 3a.

A head 16 consists of a pair of side plates 16a and 16b which are vertically disposed, a connecting plate 16c which is slightly shorter than the side plates 16a, 16b and which is fixed to the upper edges thereof, an attaching plate 16d which is fixed between the left ends of the side plates 16a and 16b, and a link plate 17 which is fixed to the upper face of the connecting plate 16c.

To both ends of a rotary axle 18 which passes through the side plates 16a and 16b, are attached the left ends of the side plates 9a and 9b of the second arm assembly 9 respectively in such a manner that the side plates 9a and 9b come into contact with the outer sides of the side plates 16a and 16b respectively. The lower ends (the right ends in FIG. 2) of a pair of link plates 19,19 which are disposed parallel to each other with a slight space inbetween, are fixed to the rotary axle 18 between the side plates 16a and 16b. A pin 20 is fixed to the upper end thereof, and the left end of the second coupling lever 15 is attached to the right end of the link plate 17 of the head 16 between the links 19,19 by means of the pin 20. The distance between the pins 14 and 20 of the second coupling lever 15 is equal to the distance between the rotary axles 10 and 18.

As shown in FIG. 3, a suction cup 21 provided at the left side of the attaching plate 16d of the head 16 has an inverted cup-shaped configuration and a suction passage 22 provided at the center of the inner face of the cup is connected to a compressed air passage 23 of a small diameter located to the right as viewed in FIG. 3 and a passage of a larger diameter 24 located to the left at the upper part in the suction cup 21. A compressed air supply opening 25 located under the compressed air passage 23 opens close to the opening of the suction passage 22 in the inner face of the cup. The above-mentioned compressed air passage 23 and the compressed air supply passage 25 are respectively connected to a compressed air source by means of air hoses, but they are omitted in the drawings.

Turning now to the operation of the manipulator, when the apparatus in accordance with the present invention is in the condition shown in the drawings, if the first rotary cylinder motor means 3 is actuated in a clockwise direction thereby rotating the first arm assembly 5 which is fixed to the driving axle 3a of the first rotary cylinder motor means 3, the second sprocket 11 will be rotated in the direction to shift the upper part thereof backward, because the first sprocket 6 is restrained by the second rotary cylinder motor means 4. Thus, the manipular will move from the broken line to the solid line position in FIG. 1. Therefore, the second arm assembly 9 fixed to the rotary axle 10 will rotate in the upward direction around the rotary axle 10, and the head 16 will shift approximately horizontally to the left, as shown by the broken lines, by the above-mentioned action of the arm levers 5 and 9.

When the second rotary cylinder power means 4 is actuated, the motive force is transmitted in sequence to the first sprocket 6, the chain 12, the second sprocket 11, the rotary axle 10, and the second arm assembly 9, thereby making it possible to rotate the second arm assembly 9 freely around the rotary axle 10. During the above-mentioned action, the suction cup 21 is always maintained in a face-down disposition by the action of the connecting levers 8 and 15, and the link plates 17, 13 and 19. In this manner, by the operation of the rotary cylinders power means 3 and 4, the suction cup 21 may be moved to any arbitrary or desired position with the suction cup always being maintained face-down. For example, in order to transport an article located at a point A to a point D in FIG. 4, the second rotary cylinder power means 4 is actuated, thereby rotating the second arm assembly 9 downwardly and bringing the suction cup 21 into contact with the upper surface of the article at the point A, and compressed air is supplied to the compressed air passage 23 of the suction cup 21, thereby reducing the pressure in the suction cup 21 due to the venturi effect and allowing it to adhere to the article by suction. A suction cup using such a venturi effect is disclosed in U.S. Pat. No. 3,912,317 issued Oct. 14, 1975. Then, the second rotary cylinder power means 4 is actuated, thereby rotating the second arm assembly 9 in a clockwise direction and moving up the article from position A to position B, and then the second rotary cylinder power means 4 is stopped and the first rotary cylinder power means 3 is actuated, thereby rotating the first arm assembly 5 in a clockwise direction. Then, the second arm assembly 9 is moved through the sprockets 6 and 11, and the chain 12, and the article reaches the point C. In this case, if the ratio in the number of teeth between the sprockets 6 and 11 is 2 to 1, and the effective length of the first arm assembly 5 is equal to that of the second arm assembly 9, the suction cup 21 will move along a straight line. Then, the actions of the rotary cylinders power means 3 and 4 are switched, thereby lowering the article to the position D, and the supplying of the compressed air to the compressed air passage 23 of the suction cup 21 is stopped. At the same time, compressed air is instantly sent into the suction cup 21 through the compressed air supply opening 25, and then the article will be instantly separated from the suction cup 21 and deposited at the position D. In order to transport an article from position D to position A, it is only necessary to carry out the operations in the reverse sequence. It is a matter of course that one may simultaneously and continuously carry out the above-mentioned operations of the rotary cylinder motor means 3 and 4.

In the above-mentioned example, the power sources are the rotary cylinder power means 3 and 4 which are operated by compressed air, and power transmission to the second arm assembly 9 is effected by means of the sprockets 6 and 11 and the chain 12, and an article is held by the suction under reduced pressure by means of the suction cup 21. However, it should be understood that the present invention is not restricted only to the use of these devices and that it is, for example, possible to use a brake motor as a power source, to drive the second arm assembly 9 by means of bevel gears and driving levers, and to hold an article by the action of an electromagnet.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A manipulator comprising a first arm assembly having a base end portion and a free end portion, attachment means on which said base end portion is pivotally mounted by first pivotal means for pivotal movement about a first pivotal axis, first power means operatively connected to said first arm assembly to effect rotation of the latter about said first pivotal axis, a second arm assembly having a base end portion and a free end portion, second pivotal means pivotally mounting said base end portion of said second arm assembly to said free end portion of said first arm assembly for pivotal movement about a second pivotal axis, second power means, coupling means coupling said second power means to said second arm assembly to effect rotation of the latter about said second pivotal axis, holding means on said free end portion of said second arm assembly for holding an article which is to be moved by the manipulator, third pivotal means for pivotally mounting said holding means to the free end of said second arm assembly for pivotal movement about a third axis, a first coupling lever disposed parallel to the longitudinal axis of said first arm assembly and having a length equal to the length of said first arm assembly, said first coupling lever having one end pivotally mounted to said attachment means for pivotal movement about a fourth pivotal axis which is spaced from said first pivotal axis, first link means extending from said second pivotal means, said first coupling lever having its other end pivotally connected to said first link means for pivotal movement about a fifth pivotal axis spaced from said second pivotal axis, said first, second, fourth and fifth pivotal axes defining a first parallelogram, a second coupling lever disposed parallel to the axis of said second arm assembly and having a length equal to the length of said second arm assembly, said second coupling lever having one end pivotally mounted on said first link means for pivotal movement about said fifth pivotal axis, second link means extending from said third pivotal means, said second coupling lever having its other end pivotally connected to said second link means for pivotal movement about a sixth pivotal axis spaced from said third pivotal axis, a link plate means extending from said holding means and pivotally connected to said other end of second coupling lever at said sixth pivotal axis, said second, third, fifth and sixth pivotal axes defining a second parallelogram, whereby said second and fifth pivotal axes are common in both said first and second parallelograms and said holding means is maintained in a generally horizontal diposition independently of the relative pivotal positions of said first and second arm assemblies.

2. A manipulator according to claim 1 wherein said first and second power means are rotary motors mounted on said attachment means, said rotary motors having rotational axes common to said first pivotal axis.

3. A manipulator according to claim 2 in which said first rotary motor is directly connnected to said first arm assembly to effect rotation of the latter about said first pivotal axis.

4. A manipulator according to claim 2 wherein said coupling means comprises a first sprocket connected to said second rotary motor, a second sprocket having an axis common to said second pivotal axis, and a chain extending between said first and second sprockets such that operation of said second rotary motor drives said second sprocket to thereby rotate said second arm assembly about said second pivotal axis relative to said first arm assembly.

5. A manipulator according to claim 4 in which said second pivotal means comprises a first shaft rotatably mounted on said free end portion of said first arm assembly, said base end portion of said second arm assembly being fixed to said first shaft, and said first link means being fixed to said first shaft.

6. A manipulator according to claim 1 in which said third pivotal means comprises a second shaft rotatably mounted on said holding means, said free end portion of said second arm assembly being fixed to said second shaft, and said second link means being fixed to said second shaft.

7. A manipulator according to claim 1 in which said first and second link means are parallel and equal in length to each other.

8. A manipulator comprising a first arm assembly having a base end portion and a free end portion attachment means on which said base end portion is pivotally mounted by first pivotal means for pivotal movement about a first pivotal axis, first power means operatively connected to said first arm assembly to effect rotation of the latter about said first pivotal axis, a second arm assembly having a base end portion and a free end portion, second pivotal means pivotally mounting said base end portion of said second arm assembly to said free end portion of said first arm assembly for pivotal movement about a second pivotal axis, second power means, coupling means coupling said second power means to said second arm assembly to effect rotation of the latter about said second pivotal axis, holding means on said free end portion of said second arm assembly for holding an article which is to be moved by the manipulator, third pivotal means for pivotally mounting said holding means to the free end of said second arm assembly for pivotal movement about a third axis, a first coupling lever disposed parallel to the longitudinal axis of said first arm assembly and having a length equal to the length of said first arm assembly, link means pivotally mounting said first coupling lever to said attachment means and to said second pivotal means to thereby define a first parallelogram, a second coupling lever disposed parallel to the axis of said second arm assembly and having a length equal to the length of said second arm assembly, and second link means pivotally mounting said second coupling lever to said second pivotal means and to said third pivotal means to thereby define a second parallelogram, whereby said second pivotal means has an axis which is common in both said first and second parallelogram and said holding means is maintained in a generally horizontal disposition independently of the relative pivotal positions of said first and second arm assemblies.

* * * * *